United States Patent
Becker et al.

(10) Patent No.: US 6,920,638 B2
(45) Date of Patent: Jul. 19, 2005

(54) DISK DRIVE

(75) Inventors: Volker Becker, Hildesheim (DE); Lothar Vogt, Barienrode (DE)

(73) Assignee: Robert Bosch GmbH, Stuttgart (DE)

( * ) Notice: Subject to any disclaimer, the term of this patent is extended or adjusted under 35 U.S.C. 154(b) by 31 days.

(21) Appl. No.: 10/296,407

(22) PCT Filed: Mar. 20, 2002

(86) PCT No.: PCT/DE02/01006

§ 371 (c)(1),
(2), (4) Date: Apr. 14, 2003

(87) PCT Pub. No.: WO02/077991

PCT Pub. Date: Oct. 3, 2002

(65) Prior Publication Data

US 2003/0165103 A1 Sep. 4, 2003

(30) Foreign Application Priority Data

Mar. 24, 2001 (DE) .......................................... 101 14 459

(51) Int. Cl.[7] .............................................. G11B 17/04
(52) U.S. Cl. ...................................................... 720/622
(58) Field of Search .............................. 369/30.6, 77.1; 720/622

(56) References Cited

U.S. PATENT DOCUMENTS

| 5,459,703 A | 10/1995 | Tanaka |
| 6,097,693 A | * 8/2000 | Nakamichi .................. 369/270 |
| 6,233,218 B1 | * 5/2001 | Hoffmann ................ 369/30.77 |
| 6,459,673 B1 | * 10/2002 | Becker et al. ......... 369/178.01 |

FOREIGN PATENT DOCUMENTS

| EP | 0 127 584 | 12/1984 |
| EP | 0 833 324 | 4/1998 |
| JP | 06004977 | * 1/1994 |

* cited by examiner

Primary Examiner—George J Letscher
(74) Attorney, Agent, or Firm—Kenyon & Kenyon

(57) ABSTRACT

A disk drive is described, having a draw-in device for disk-shaped storage media, which prevents damage to the playoff area of such storage media. The draw-in device includes a threaded rod having an axis of rotation in the push-in direction of the storage medium. The course of thread of threaded rod acts together with the edge region of a storage medium inserted into the draw-in device so that the storage medium is drawn into the disk drive or pushed out of the disk drive by the rotation of the threaded rod, depending on the direction of rotation.

14 Claims, 2 Drawing Sheets

DISK DRIVE

FIELD OF THE INVENTION

The present invention relates to a disk drive.

BACKGROUND INFORMATION

Disk drives may be configured as compact disk players which may have a draw-in device for disk-shaped storage media, such as for compact disks. Such a draw-in device may be configured as a roller draw-in device having at least one roller which draws the storage medium to be played into the disk drive or ejects it therefrom.

SUMMARY OF THE INVENTION

By contrast, an exemplary disk drive according to the present invention may provide that the draw-in device includes a threaded rod having a rotary axis in the insertion direction of the storage medium, and that the course of thread of the threaded rod may cooperate with the edge region of a storage medium introduced into the draw-in device so that the storage medium is drawn into the disk drive or pushed out of the disk drive by the rotation of the threaded rod, depending on the direction of the rotation. In this manner, a disk-shaped storage medium may be drawn into the disk drive or pushed out of it only via its side edges in the edge region of the storage medium, without stress to the playoff area. Damage to the playoff area of the storage medium by dust and dirt particles, as may appear during drawing in and pushing out with the aid of a roller may thus be prevented, without a greater constructive expenditure being required for this.

The pitch of the course of thread may be selected, compared to the radius of the storage medium, so that the threaded rod becomes engaged directly with the edge region of the storage medium when it is inserted into, or pushed out of the disk drive. In this manner, the disk-shaped storage medium may be accurately positioned during insertion in and ejection from the disk drive, at least construction cost, since the storage medium may be in a specified position, based on the direct contact of its side edge with the course of thread of the threaded rod. In this manner, also, a form locked force transmission may be brought about.

A guide element having an inner thread may be provided. The guide element may be screwed onto the threaded rod and may be moved along it by rotation of the threaded rod. The guide element may include an accommodation which accommodates a part of the edge region of the storage medium to be transported, so that the storage medium may be drawn into, or pushed out of the disk drive by the rotation of the threaded rod with the aid of the guide element, depending on the direction of rotation.

In this manner, a form locked force transmission, while drawing the storage medium into the disk drive or while pushing it out, may also be possible. In addition, in this manner, an accurate positioning of the storage medium may be put into effect at insertion into and ejection from the disk drive, since the storage medium may be held in a definite position by the accommodation.

The storage medium, at its widest part, may also be transported beyond the end of the threaded rod, if the accommodation is arranged on the guide element in an appropriately offset manner. Then the accommodation may be transported into a fixture cap of the disk drive, and may make possible a further pushing out of the storage medium from the disk drive. Conversely, the storage medium may have to be pushed less far into the disk drive by the user, until it is grabbed by the accommodation for further pushing-in. This may enhance the ease of operation for the user.

The accommodation may include at least one fixing element for fixing the storage medium in the accommodation. In this manner, having the storage medium slip out of the accommodation may be prevented.

The at least one fixing element may be supported rotatably on the receptacle. Thereby frictional forces may be reduced when the storage medium is transported into, or out of the disk drive. The storage medium may then perform a rotating movement when the storage medium is transported into or out of the disk drive, such as, for example, if it has a circular circumference, and thus may be transported into or out of the disk drive, not with the aid of sliding friction but rather rolling friction.

The guide element may include a depth-limiting element which may be positioned, on the side of the receptacle facing away from a draw-in opening of the disk drive, so that it may prevent the storage medium from being pushed in past the receptacle. In this manner it may be ensured that the storage medium may not be pushed too deeply into the disk drive, and may not go beyond the actual catch position defined by the receptacle.

The disk drive may have a guide rail in which the edge region of the storage medium may be guided on its side facing away from the threaded rod, when the storage medium is pushed into, or pushed out of the disk drive. In this manner, a straight line movement of the storage medium may be ensured during its transport into or out of the disk drive.

At least one springy element may be provided which presses the guide rail against the storage medium in the direction towards the threaded rod, when the storage medium is pushed into, or when the storage medium is pushed out of the disk drive. In this manner, the storage medium may be clamped in a defined position by the guide rail and the threaded rod, or rather the shiftable guide element on the threaded rod.

DETAILED DESCRIPTION

Figure 1:
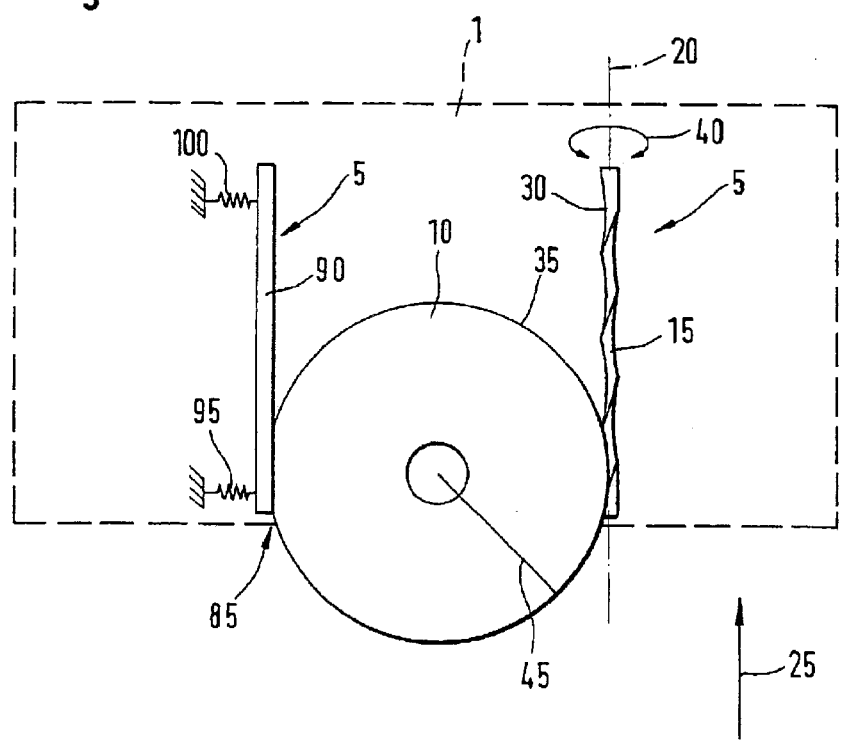
FIG. 1 shows a first exemplary embodiment of a disk drive according to the present invention.

In FIG. 1, 1 identifies a disk drive for playing off or recording on disk-shaped storage media 10. With regard to disk drive 1, a compact disk player may, for example, be involved, or a minidisk player, a DVD player (digital versatile disk), a compact disk changer, an MP3 player (MPEG Layer 3, MPEG=Motion Picture Expert Group) or the like. Correspondingly, disk-shaped storage medium 10 is then a compact disk, a minidisk, a DVD disk, an MP3 disk or the like. In this context, storage medium 10 has a circular circumference in this exemplary embodiment. This, however, may not be required for the implementation of the present invention. Disk drive 1 includes an insertion opening 85, via which storage medium 10 is insertable into disk drive 1 or is able to be pushed out of disk drive 1. Disk drive 1 also includes a threaded rod 15 having an axis of rotation 20 which is present in insertion direction 25 of storage medium 10, and thus perpendicular to insertion opening 85 of disk drive 1. The thread of threaded rod 15 is defined by a course of thread. Threaded rod 15 may be motor-driven, the motor being able to rotate threaded rod 15 about its axis of rotation 20 in two opposite rotational directions 40. Threaded rod 15 is arranged at one end of insertion opening 85. Parallel to threaded rod 15 and lying opposite to it at the other end of insertion opening 85, disk drive 1 includes a guide rail 90. Guide rail 90 is able to be connected via a first spring element 95 and a second spring element 100 to the body of disk drive 1, the springy elements 95, 100 being arranged on the side of guide rail 90 facing away from threaded rod 15, so as to be able to push guide rail 90 in the direction towards threaded rod 15. In place of first springy element 95 and second springy element 100, there may also be provided only one springy element or more than two springy elements, in a corresponding manner. However, by using at least two springy elements, for example, a stable support of guide rail 90 in disk drive 1 may already be effected, particularly when both springy elements 95, 100 are positioned at the ends of guide rail 90, as shown in FIG. 1. Threaded rod 15 and guide rail 90, together with first springy element 95 and second springy element 100 form an insertion 5 for storage medium 10, as in FIG. 1.

The distance of guide rail 90 from threaded rod 15 corresponds approximately to the width of storage medium 10, that is, in the case of a storage medium 10 having a circular circumference as in FIG. 1, the diameter of storage medium 10. In order to be able to draw storage medium 10 into the disk drive or push it out from the disk drive, safely and in a specific position, the distance of guide rail 90 from threaded rod 15 may be slightly smaller than the diameter of storage medium. That is why, when storage medium 10 is inserted into disk drive 1 via draw-in compartment 85, guide rail 90 is first of all gently pushed away from threaded rod 15. Thus, storage medium 10 engages guide rail 90 on one side and course of thread 30 of threaded rod 15 on the other side. In this context, the pitch of course of thread 30 should be selected in relationship to radius 45 of the storage medium so that edge region 35 of storage medium 10, that is, the side edge of storage medium 10, may engage directly with one turn of course of thread 30. Now, if threaded rod 15 is turned towards the left about axis of rotation 20, storage medium 10 is drawn into the inside of disk drive 1, by threaded rod 15 via its edge region 35. On the side opposite threaded rod 15, edge region 25 of storage medium 10 is guided in guide rail 90, which, on account of springy elements 95, 100, presses storage medium 10 against threaded rod 15, and thus makes possible a secure sliding in of storage medium 10 in a specific position into disk drive 1. In this manner, storage medium 10 may be brought exactly into recording or playoff position in disk drive 1. Ejection of storage medium 10 from disk drive 1 occurs correspondingly in the opposite manner, threaded rod 15, in this case, being rotated to the right about axis of rotation 20. Thus, during transport into or out of disk drive 1, threaded rod 15 engages storage medium 10 in a form-locking manner, guide rail 90 ensuring a straight line motion of storage medium 10.

Figure 2:
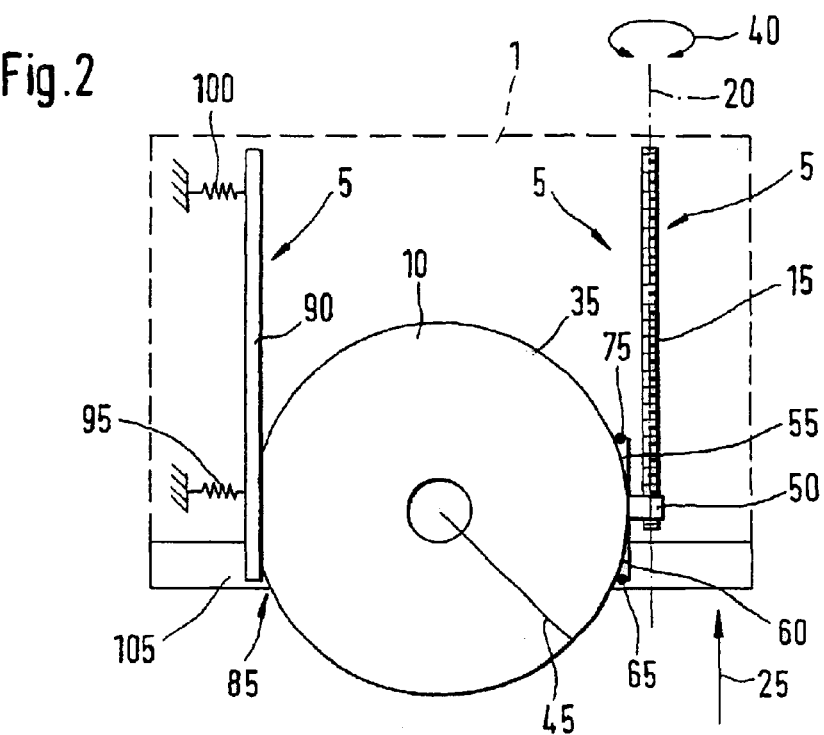
FIG. 2 shows a second exemplary embodiment of the disk drive according to the present invention.

A second exemplary embodiment of the present invention is shown in FIG. 2, the same reference numerals characterizing the same elements as in FIG. 1. By contrast with the first exemplary embodiment as in FIG. 2, in the second exemplary embodiment according to FIG. 2, storage medium 10 is no longer transported by direct engagement of its edge region or its side edge 35 with threaded rod 15 into or out of disk drive 1, but is movable along threaded rod 15 via a guide element 50, which, furnished with an inner thread, is screwed onto threaded rod 15, and by rotating threaded rod 15 about axis of rotation 20. To do this, guide element 50 includes an accommodation 55, which accommodates a part of side edge 35 of storage medium 10. Transport of storage medium 10 into or out of disk drive 1 may thus be performed in the same manner as in the first exemplary embodiment as in FIG. 1, with the exception that storage medium 10 is no longer in direct engagement with threaded rod 15, but indirectly with it via accommodation 55. By rotation of threaded rod 15 to the left about axis of rotation 20, guide element 50 along with accommodation 55, and thus along with storage medium 10, is moved into the interior of disk drive 1. If threaded rod 15 is rotated to the right about axis of rotation 20, guide element 50 along with accommodation 55 and thus with storage medium 10 is moved out of disk drive 1. Now, in FIG. 2 a fixture cap 105 of disk drive 1 is shown, which encloses draw-in opening 85. According to FIG. 2, guide rail 90 extends into fixture cap 105. Now, if accommodation 55 is positioned shifted to an extent with respect to draw-in opening 85 on guide element 50, and not symmetrically with respect to guide element 50 as shown in FIG. 2, the consequence may be that storage medium 10 may be pushed further out of draw-in opening 85 than may be possible in the case of direct engagement with threaded rod 15.

Figure 3:
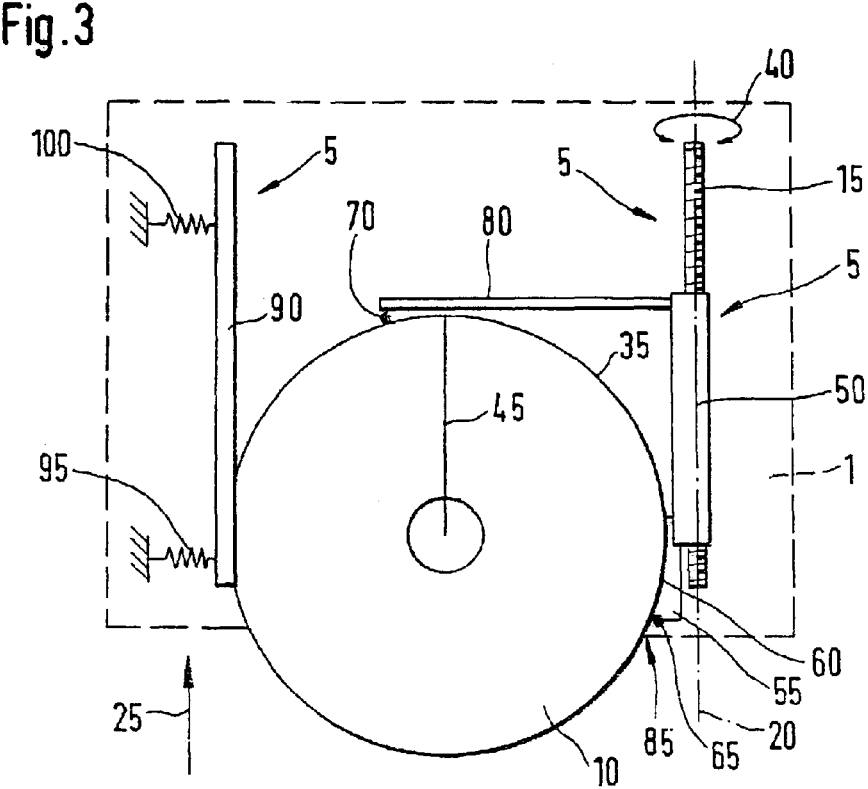
FIG. 3 shows a third exemplary embodiment of the disk drive according to the present invention.

An accommodation 55 positioned in an offset manner on guide element 50 in the direction towards draw-in opening 85 may be seen in the third exemplary embodiment as in FIG. 3.

When there is direct engagement of storage medium 10 with threaded rod 15, the eject process is ended when storage medium 10 at its widest part has reached the end of threaded rod 15 facing draw-in opening 85. However, when accommodation 55 is positioned offset to guide element 50 in the direction towards draw-in opening 85, storage medium 10 may still be transported with the aid of accommodation 55 and guide rail 90 even when the widest part of storage medium 10 has passed the end of threaded rod 15 facing draw-in opening 85, in the direction towards draw-in opening 85. The other way around, when storage medium 10 is pushed in, it may be grabbed early by draw-in device 5, or rather guide rail 90 and accommodation 55, indeed even before the widest part of storage medium 10 has passed the end of threaded rod 15 facing draw-in opening 85. Insertion and retrieval of storage medium 10 into or out of disk drive 1 respectively thus may become, for example, user-friendly.

In this context, accommodation 55 may also be moved into fixture cap 105, in order to make possible this more user-friendly ejecting or drawing in of storage medium 10 from or into disk drive 1, respectively.

In the second exemplary embodiment according to FIG. 2, accommodation 55 is configured so that it includes a depression 60 facing storage medium 10, which encloses a part of side edge 35 of storage medium 10. Depression 60 thus spans a circular arc-shaped bordering surface whose radius is the same as radius 45 of storage medium 10.

Now, in addition, it may be provided that accommodation 55 includes at least one fixing element for fixing storage medium 10 at accommodation 55. In this manner it may be prevented that storage medium 10 slips out of accommodation 55 during its transport into or out of disk drive 1. According to FIG. 2, a first fixing element 65 and a third fixing element 75 are provided, which are each positioned at one end of accommodation 55 that faces storage medium 10. In this connection, fixing elements 65, 75 are able to be supported in spring fashion on accommodation 55, so that when storage medium 10 is brought into accommodation 55 they first spring back, and then, when storage medium 10 has been brought into accommodation 55, they press on it in the direction of guide rail 90. With the aid of the two fixing elements 65, 75 and because of storage medium 10 lying against guide rail 90, storage medium 10 is held and is transported into and out of disk in a stable three-point support in a definite position.

Now, in addition, the at least one fixing element or the two fixing elements 65, 75 may be supported rotatably on accommodation 55, according to FIG. 2. In this manner, frictional forces may be reduced during the transport of storage medium 10 into or out of disk drive 1. The sliding friction of storage medium 10 on guide rail 90 and fixing elements 65, 75 then may become a rolling friction. Fixing elements 65, 75 may in this case be configured in circular-shaped circumference.

In a third exemplary embodiment as in FIG. 3, again, the same reference numerals refer to the same elements as in the previous figures. In this case, the third exemplary embodiment as in FIG. 3 is based on the second specific embodiment as in FIG. 2 with regard to the transporting mechanism and the use of guide element 50 and accommodation 55. Now, in addition, in the third exemplary embodiment as in FIG. 3, guide element 50 includes a depth-limiting element 80 which is positioned on a side of accommodation 55 facing away from draw-in opening 85 of disk drive 1. According to FIG. 3, depth-limiting element 80 is configured as a crosspiece running perpendicular to threaded rod 15 and guide rail 90, whose length is approximately half the distance between threaded rod 15 and guide rail 90. As shown in FIG. 3, depth-limiting element 80 is formed even a little longer than this half of the separation distance. In the third specific embodiment according to FIG. 3, depth-limiting element 80 is positioned at one end of guide element 50. At the other end, and thus offset in the directions towards draw-in opening 85, accommodation 55 is arranged on guide element 50. The distance between accommodation 55 and depth-limiting element 80 amounts, thus, approximately to radius 45 of storage medium 10. In this context, the length of guide element 50 on threaded rod 15 may also be equivalent to radius 45. Using this arrangement, it may be avoided that storage medium 10 is pushed into disk drive 1 beyond accommodation 55. Pushing it in farther is blocked by depth-limiting element 80.

According to FIG. 3, depth-limiting element 80 may also include one or more fixing elements for fixing storage medium 10 to depth-limiting element 80. For this purpose, according to FIG. 3, depth-limiting element 80 has a second fixing element 70 at its end facing away from guide element 50, which may also be supported in springy fashion on depth-limiting element 80 so as to press against storage medium 10, in the same manner as described for the second exemplary embodiment according to FIG. 2. In this context, according to FIG. 3, only one fixing element is positioned on accommodation 55, namely first fixing element 65, at the end of accommodation 55 facing draw-in opening 85. Thus, in the third specific embodiment according to FIG. 3, storage medium 10 is held by first fixing element 65, second fixing element 70 and guide rail 90 in a stable three-point support, and in this manner it may be transported in a definite position into and out of disk drive 1. If second fixing element 70 is supported rotatably on depth-limiting element 80, and first fixing element 65 is supported rotatably on accommodation 55, the rolling friction already described for the second exemplary embodiment according to FIG. 2 may be achieved during the transport of storage medium 10 into and out of disk drive 1.

Second fixing element 70 may, for example, be furnished with a circular circumference. Furthermore, in the case of the third specific embodiment according to FIG. 3, third fixing element 75 may also be positioned at the end of accommodation 55 facing away from draw-in opening 85 as described in FIG. 2, in addition to or alternatively to first fixing element 65.

Disk drive 1 according to an exemplary embodiment of the present invention may be suitable for mobile use, for example in motor vehicles, since it may be configured sparingly in construction, and thus in a space-saving manner.

What is claimed is:

1. A disk drive comprising:
   a storage medium; and
   a draw-in device for the storage medium, wherein the draw-in device includes a threaded rod having an axis of rotation in a slide-in direction of the storage medium and having a course of thread that cooperates with an edge region of the storage medium introduced into the draw-in device so that the storage medium is one of drawn into and pushed out of the disk drive depending on a rotation direction of the threaded rod.

2. The disk drive of claim 1, wherein the storage medium is disk-shaped.

3. The method of claim 1, wherein a pitch of the course of thread is selected, compared to a radius of the storage medium, so that the threaded rod engages directly with the edge region of the storage medium when the storage medium is one of inserted into and pushed out of the disk drive.

4. The disk drive of claim 1, further comprising:
   a guide element screwed onto the threaded rod and configured to move along the threaded rod by rotation of the threaded rod, the guide element including an inner thread and an accommodating arrangement to accomodate a part of the edge region of the storage medium so that the storage medium is one of drawn into the disk drive and pushed out of the disk drive by the rotation of the threaded rod with an aid of the guide element, depending on the rotation direction.

5. The disk drive of claim 4, wherein the accommodating arrangement includes a depression facing the storage medium to enclose a part of the edge region of the storage medium with form locking.

6. The disk drive of claim 5, wherein the accommodating arrangement includes at least one first fixing element to fix the storage medium to the accommodation.

7. The disk drive of claim 6, wherein the at least one first fixing element is rotatably supported on the accommodating arrangement.

8. The disk drive of claim 6, wherein the at least one first fixing element is positioned at a first end of the accommodating arrangement.

9. The disk drive of claim 4, wherein the guide element includes a depth-limiting element arranged on a side of the accommodating arrangement facing away from a draw-in opening of the disk drive to prevent the storage medium from being pushed in beyond the accommodating arrangement.

10. The disk drive of claim 9, wherein the depth-limiting element includes at least one second fixing element to fix the storage medium to the depth-limiting element.

11. The disk drive of claim 10, wherein the at least one second fixing element is rotatably supported on the depth-limiting element.

12. The disk drive of claim 10, wherein the at least one second fixing element is arranged at one end of the depth-limiting element.

13. The disk drive of claim 1, further comprising:

a guide rail to guide to the edge region of the storage medium on a side of the storage medium facing away from the threaded rod when the storage medium is one of pushed into and pushed out of the disk drive.

14. The disk drive of claim 13, further comprising:

at least one springy element to press the guide rail against the storage medium in a direction towards the threaded rod when the storage medium is one of pushed into and pushed out of the disk drive.

* * * * *